Figure 1:
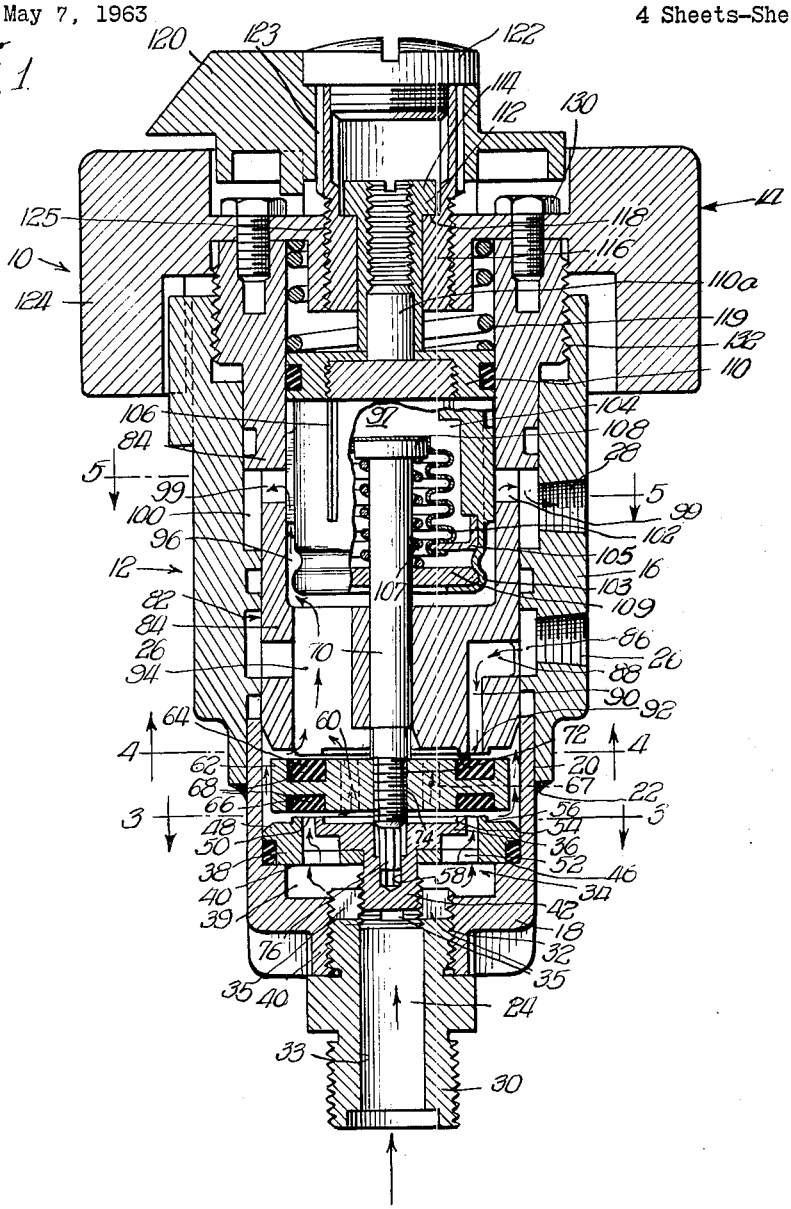

Jan. 11, 1966   R. J. NORMAN   3,228,603
THERMOSTATIC MIXING VALVE WITH VOLUME CONTROL
Filed May 7, 1963   4 Sheets-Sheet 1

INVENTOR.
Robert J. Norman,
BY
Byron, Hume, Groen + Clement
Attys

Jan. 11, 1966  R. J. NORMAN  3,228,603
THERMOSTATIC MIXING VALVE WITH VOLUME CONTROL
Filed May 7, 1963  4 Sheets-Sheet 2
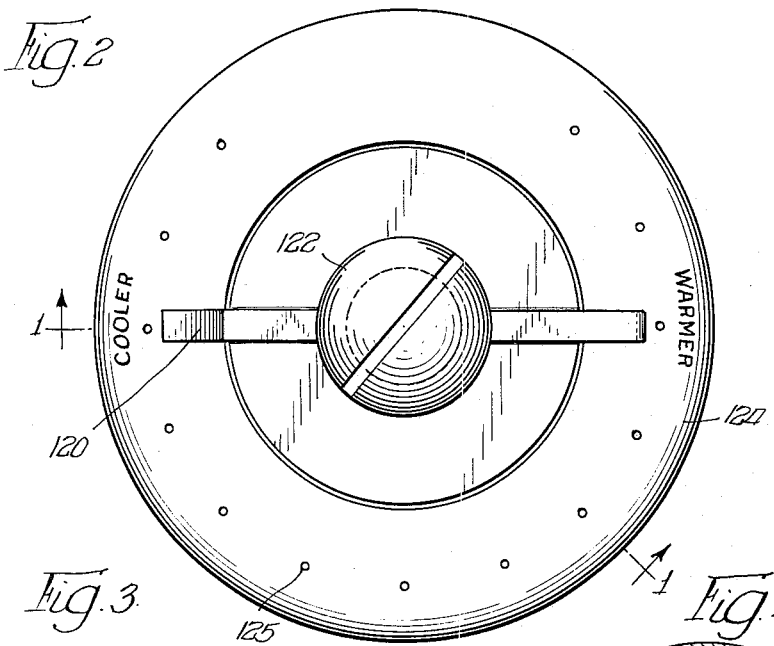
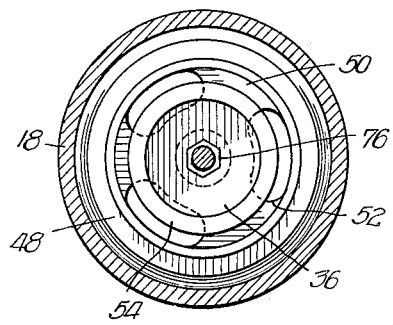
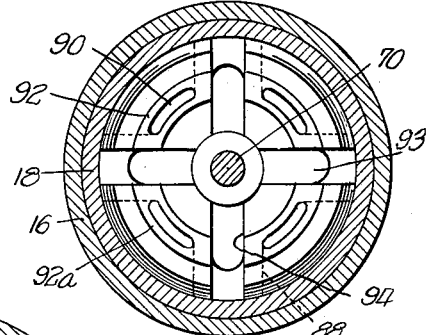
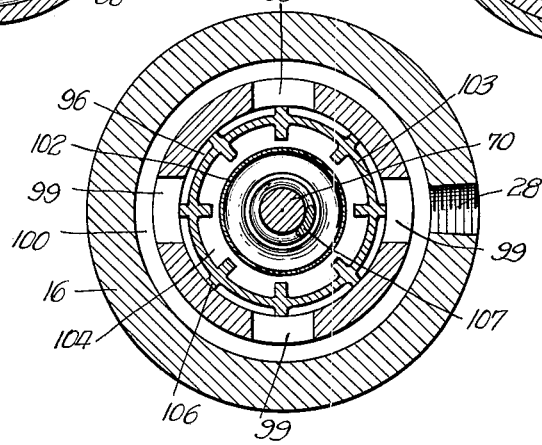
INVENTOR.
Robert J. Norman,
BY
Byron, Hume, Groen + Clement
Attys.

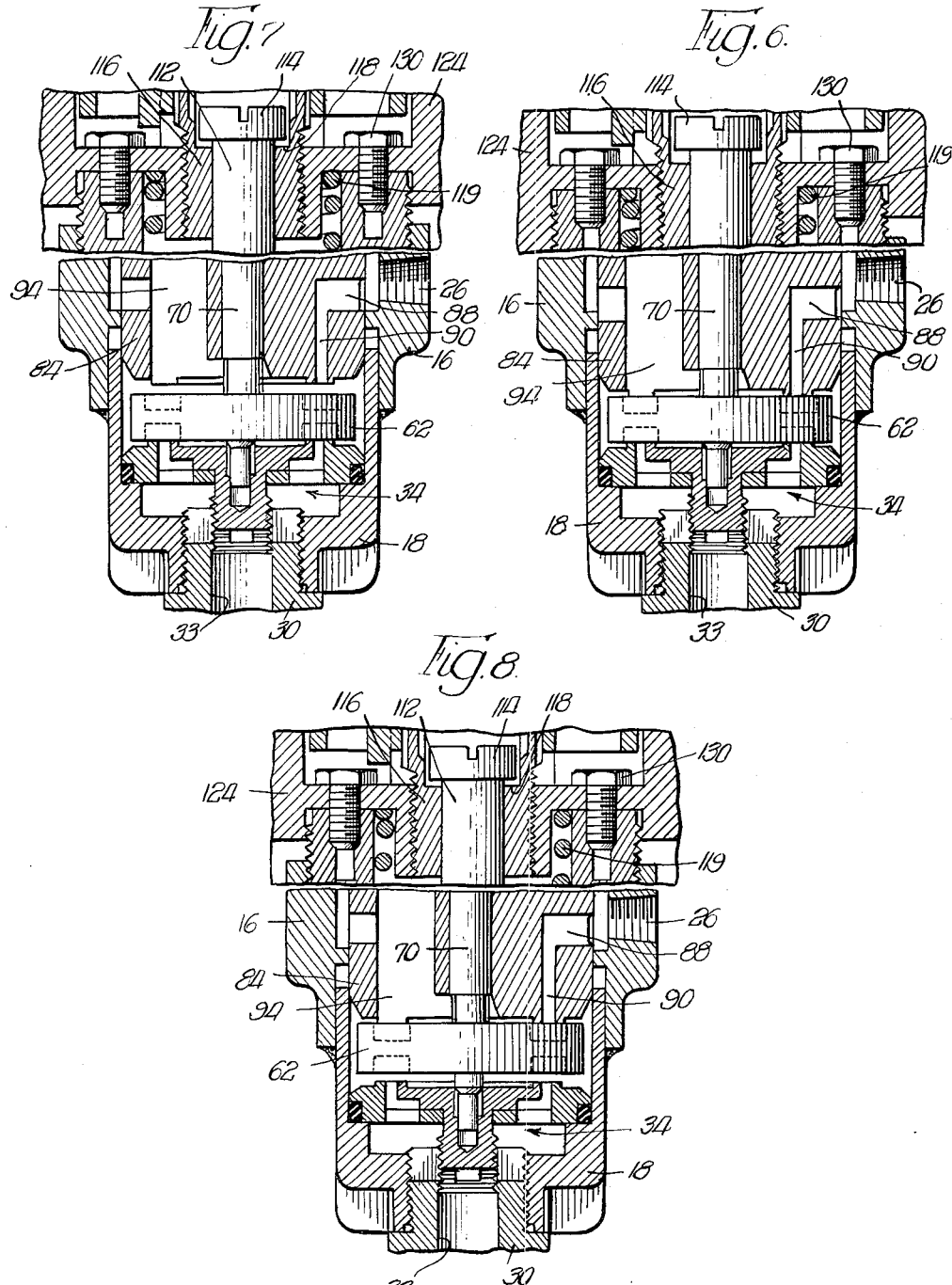

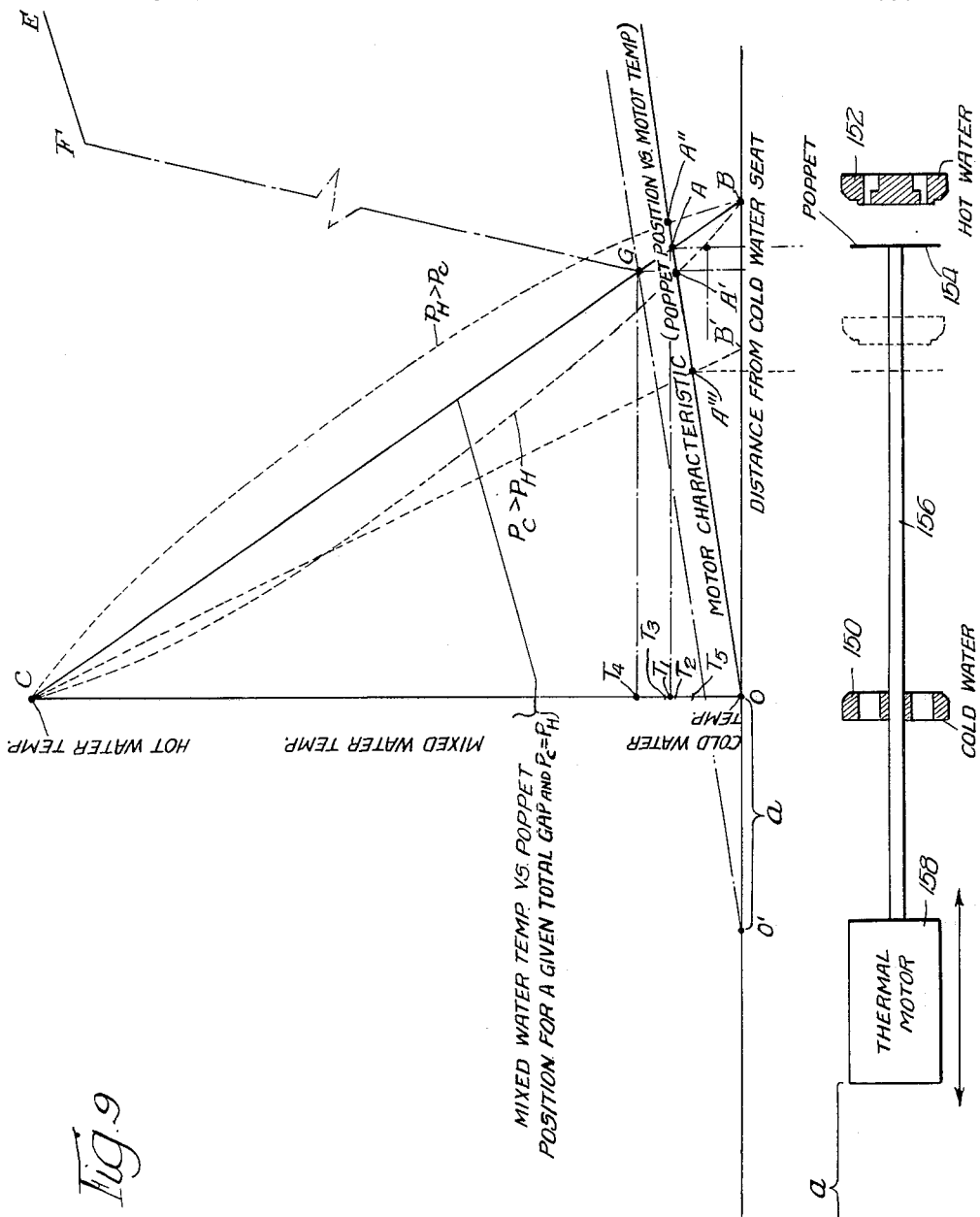

United States Patent Office 3,228,603
Patented Jan. 11, 1966

3,228,603
THERMOSTATIC MIXING VALVE WITH
VOLUME CONTROL
Robert J. Norman, Chicago, Ill., assignor to The Powers Regulator Company, Skokie, Ill., a corporation of Illinois
Filed May 7, 1963, Ser. No. 278,546
7 Claims. (Cl. 236—12)

This invention pertains to an improved valve mechanism and in particular to a mixing valve adapted to receive liquid from two sources and to mix the same in a pre-selected ratio and a pre-determined volume of the mixed liquids. One particular type of system in which the invention is especially suited to be used consists of a source of hot liquid and a source of cold liquid and to mix the same to provide liquid at some temperature within the range temperatures intermediate those of the sources. More specifically, the invention may be used as a mixing valve in a plumbing system such as would be found in a residential dwelling and of the type that would be mounted in a shower, lavatory or the like.

Mixing valves are commonly used for many purposes and numerous types and designs are found in the prior art. Some of the prior art valves have been satisfactory at least to a limited extent while many others have been less than satisfactory. Some of the disadvantages commonly found in the prior art mixing valves are as follows: (1) Limited volume range in which a pre-selected temperature can be maintained; (2) Requirement of check valves mounted in the supply lines to prevent cross-over from one line to the other in the event one source is at a higher pressure than the other; (3) Shut off and volume control mechanism being at the outlet rather than at the inlets; (4) High back pressure in mixing chamber; and (5) Being relatively complicated and correspondingly expensive.

The subject invention substantially eliminates all of the aforementioned objections. For example, a mixing valve embodying the invention can maintain a substantially constant temperature throughout a variable volume range extending from very high to very low flow rates. In fact such a valve can maintain a pre-selected temperature even when the flow rate consists of only a few drops per second. The invention further eliminates the possibility of inter-flow between the sources regardless of any disparity in pressure. As a result it is not necessary to use check valves in the supply lines connected to the valve. The back pressure within the mixing chamber is substantially minimized.

Finally, the invention substantially reduces the complexity and cost normally found in mixing valves of this type.

Briefly the invention may be described as a mixing valve having a pair of valve seat members respectively connected to a first and second source of liquid. Each of the valve seat members is provided with port means from which liquid from their respective sources may flow. The valve seat members are moveable with respect to each other so as to vary the total volume flowing therefrom. A valve member is mounted in cooperation with the valve seat members so that movement of the valve member with respect to one of the valve seat members to vary the flow therefrom will cause an inverse variation in the flow from the other valve seat member. In one preferred form the valve seat members are adapted to seat on the valve member when the mixing valve is in an off condition. The valve member may be connected to a thermal sensing means which senses the temperature of the mixed water. The thermal sensing means drives the valve member with respect to the valve seat members to maintain a pre-selected temperature.

A foremost feature and object of the invention resides in the provision of a mixing valve mechanism which is capable of maintaining a substantially constant preselected temperature throughout a volume range extending from relatively high to relatively low flow rates.

A further feature and object of the invention resides in the provision of a valve mechanism in which the control of the volumes from the respective sources is at their inlets. A still further feature and object of the invention resides in the provision of a mixed valve mechanism in which the shut off means for both sources is at their inlets. The shut off and control of the flow at the inlets results in a further feature of reducing the back pressure in the mixing chamber of the valve.

A still further feature and object of the invention resides in the provision of a mixing valve mechanism in which the outlet for the mixed water is normally unobstructed whether or not there is flow through the valve.

A still further feature and object of the invention resides in the provision of a mixing valve mechanism which substantially eliminates the possibility of inter-flow between the sources connected to the mixing valve regardless of any disparity of pressure between such sources.

A still further feature and object of the invention resides in the provision of a mixing valve mechanism which substantially eliminates the necessity of check valves for preventing inter-flow between the sources of supply connected to the mixing valve.

A still further feature and object of the invention resides in the provision of a mixing valve mechanism of a substantially simplex and low-cost construction.

The above features and objects of the invention among others will be apparent upon reading of the specification with reference to the following drawings:

In the drawings:
FIGURE 1 is a sectional view of a mixing valve embodying the invention taken along the lines 1—1 in FIGURE 2;
FIGURE 2 is a plan view of the mixing valve;
FIGURE 3 is a sectional view taken along the lines 3—3 in FIGURE 1;
FIGURE 4 is a sectional view taken along the lines 4—4 in FIGURE 1;
FIGURE 5 is a sectional view taken along the lines 5—5 in FIGURE 1;
FIGURE 6 is a fragmentary sectional view showing the valve mechanism in which both sources are shut off;
FIGURE 7 is a fragmentary sectional view showing the valve mechanism in which one of the sources is shut off and the other of the sources is open;
FIGURE 8 is a fragmentary sectional view in reverse of FIGURE 7; and
FIGURE 9 is a graphical presentation illustrating the operation of the valve mechanism embodying the invention.

Before proceeding with the description of the invention, it will be understood that the various components of the valve may be constructed of any suitable materials having properties that will permit the intended function. It has been found in many instances that plastics such as Delrin, nylon, Teflon and the like, as well as metals may be suitable.

As stated previously, one use for which the valve mechanism is especially suited is in residential plumbing systems. It will be understood that this is merely by way of example and that the valve may be used wherever it will provide the desired result. While the valve mechanism is particularly suited for mixing hot and cold water, it will be obvious that it may be used for other liquids as well. Thus for purposes of convenience the liquids may sometimes hereinafter be referred to as hot or cold water but this is not to be construed as a limitation.

It will be further apparent that the mixing valve mechanism is particularly suited for providing a mixed liquid of a pre-selected temperature from a plurality of sources. The valve mechanism may be used in other applications where the controlled variable is something other than temperature and also where the controlled fluids are gases.

Referring now to FIGURE 1 there is shown one preferred form of the invention as used in a mixing valve of the type especially suited for use in a residential plumbing system. The mixing valve 10 comprises a casing assembly 12 and a control knob assembly 14. The casing assembly 12 includes the upper casing member 16 and a lower casing member 18. The casing members 16 and 18 are joined in a telescoping relationship 20 and are secured together in any suitable fashion such as the weld 22. The casing assembly, however, may be fashioned from a single casing.

The lower casing member 18 is provided with an inlet port 24 which in this instance will be designated as the hot water port. The upper casing 16 is provided with a cold water port 26 and an outlet port 28. The outlet port may be connected to or comprise a faucet nozzle (not shown) or similar device.

The hot water port 24 is adapted to receive a fitting 30 for facilitating engagement with a supply line extending between the source of hot water and the mixing valve 10. The fitting 30 extends through an aperture 32 in the casing 18 and is threadably secured thereto. The fitting 30 is provided wih the bore 33 which is threaded at its upper end and is provided with the radial slots 35.

A hot water valve seat mechanism 34 is mounted within the casing member 18. The valve seat mechanism comprises a substantially circular disk 36 and an annular member 38 arranged in a nesting relationship. The annular member 38 is provided with an aperture 40 through which extends the threaded lug 42 projecting from the disk 36. The lug 42 is received within the bore 33 of the fitting 30. The shoulder of the disk 36 abuts the portion of the annular member 38 adjacent the aperture 40 and forces it downwardly against the shoulder on the casing 18. Thus when the disk 36 is secured to the fitting 30 the entire hot water seat assembly 34 is fixed in place with respect to the casing member 18 so as to define the annular chamber 39.

The outer ring 48 of the annular member 38 is spaced from the disk 36 so as to define an annular passage 50. In the portion of the annular member 38 intermediate the disk 36 and the outer ring 48 there are three annularly spaced arcuate slots 52, as can best be seen in FIGURE 3. The slots 52 permit the upward flow from the port 24 and chamber 39 into the passage 50.

The outer ring 48 and the disk 36 are provided with the annular lips 54 and 56 which constitute seating surfaces adjacent the annular hot water passage 50. The seating surfaces are adapted to be engaged by a poppet assembly 60 that will be described hereafter.

The poppet assembly 60 comprises a poppet disk 62 having the annular grooves 64 and 66 on its upper and lower surfaces, respectively. A ring of resilient sealing material 68 is mounted within each of the grooves 64 and 66 with that in the lower groove overlying the hot water passage 50 and the seating surfaces on the annular lips 54 and 56. A series of annularly spaced apertures 67 extend through the disk 62.

The poppet assembly further includes a valve stem 70 for purposes of actuation of the poppet disk 62. The disk is mounted on the stem by means of the threaded aperture 72 and abuts against a shoulder 74. The stem is provided with a hexagonal lug 76 which is received within the bore 58 of corresponding cross section in the disk 36. This latter arrangement assures that the poppet disk 62 will be properly aligned with respect to the hot water seat assembly 34 so that the sealing ring 68 overlies the passage 50 and the adjacent seating surfaces.

When the disk 62 is spaced from the hot water seat assembly 34, water will be permitted to flow therefrom. Specifically, the water will flow through the bore 33 and out the radial slots 35 into the annular chamber 39. From the annular chamber 39 the water flows through the slots 52, into the annular passage 50 and into the space between the seat assembly 34 and the poppet disk 62. The water then flows around up the outer periphery of the disk 62 and up through the apertures 67.

The cold water seat assembly 82 comprises a sleeve 84 which is disposed for the most part within the upper casing member 16. The upper end of the sleeve 84 is secured to the control knob assembly 14 as will be seen later on. The sleeve 84 defines in cooperation with the casing member 16 an annular passage 86 which receives the cold water through the port 26. A plurality of passages 88 extend radially inwardly through the sleeve and communicate with a like plurality of vertical passages 90. The vertical passages 90 are open at their lower ends in confronting relationship to the poppet disk 62, and particularly the ring 68 of resilient material. As shown in FIGURE 4, the vertical passages 90 are arcuate slots annularly spaced about the sleeve and are four in number.

The vertical passages 90 terminate at their lower ends in spaced arcuate bosses 92 as can be seen in FIGURE 1. The bosses 92 define the seating surfaces 92a on which are adapted to seat the poppet disk 62 and the ring 68.

The sleeve 84 is further provided with a plurality of vertical passages 94, as can be seen in FIGURES 1 and 4. The passages 94 are intermediate the bosses 92 and extend from the lower end of the sleeve 84 into the chamber 96 in which is positioned the thermal motor assembly 97.

When the poppet 62 is in an open position with respect to the end of the sleeve 84 as shown in FIGUURE 1, the cold water flows through the port 26, the annular chamber 86 into the passages 88, through and out of the vertical slots 90, and into the space between the sleeve 84 and the disk 62. The cold water there mixes with any hot water flowing through the valve and the mixed water flows upward through the slots 94 into the chamber 96 where it is brought into contact with the thermal motor assembly 97. The sleeve 84 is provided with a plurality of slots 99 which extend outwardly from the chamber 96 into an annular chamber 100 so that the water may flow through the port 28. When the poppet disk 62 is in seating engagement with the bosses 92 the cold water can no longer flow therefrom. If, however, the hot water is open and the cold water closed, the former may flow through spaces 93 intermediate the bosses 92 and into the slots 94 and thus through the outlet port 28.

The thermal motor assembly 97 comprises a bellows 102 which is secured at one end to a casing 103 so as to define the closed compartment 104. The bellows 102 is crimped to the flange 105 which is welded to the casing 103. The casing 103 is provided with a plurality of fins 106 which facilitate the transfer of heat into the compartment 104 from the mixed water flowing through the chamber 96. The compartment 104 is filled with a thermally expansive fluid such as a liquid, ether or the like. According to well known principles when the temperature of the fluid is increased its volume likewise increases. Conversely, when the temperature is decreased the volume decreases. An increase in the volume of the fluid compresses the bellows 102 and conversely a decrease in volume permits it to expand.

The upper end of the stem 70 extends into the bellows 102 and is biased into a detachable engagement with the upper end thereof by a coil spring 107. The coil spring 107 is confined between a head portion 108 at the end of the stem 70 and a cap member 109 which is received within the casing 103. The cap member 109 is secured in place by spinning over a portion of the casing 103, as shown in FIGURE 1.

As will be explained in greater detail later on, when the temperature sensed by the thermal motor assembly 97 increases beyond some pre-selected level so as to compress the bellows 102 the stem 70 and in turn the poppet disk 62 is driven downwardly toward the hot water seat assembly 34. In this manner the flow of hot water is diminished and the flow of cold water is increased since there will be a greater gap between the poppet disk 62 and the cold water seating surfaces 92a. This will cause a decrease in the temperature of the mixed water and restore it to pre-selected level. Conversely, when the temperature decreases below some pre-selected level so as to permit expansion of the bellows, the stem 70 will be driven upwardly by the coil spring 107 so the poppet is positioned more closely to the cold water seating surfaces 92a. Thus, the cold water flow is diminished whereas the hot water is increased a corresponding amount.

The thermal motor assembly 97 includes a collar 110 having a threaded stem 110a which engages the internally threaded bolt 112. The bolt 112 is provided with a headed portion 114 and is slidably received within the collar member 116. The collar member 116 is provided with a shoulder 118 which engages the head 114 of the bolt 112 so as to limit the lower-most position of the thermal motor assembly 97. The bolt 112 may be slid upwardly relative to the collar 116 so as to permit relative movement between the entire thermal motor assembly 97 and the sleeve 84. The thermal motor assembly 97 is biased downwardly by a coil spring 119 so that the bolt 112 normally engages the shoulder 118 when the mixing valve is in equilibrium-open condition. The spatial relationship of the bolt 112 and the collar 116 will be described further later on with regard to the various control conditions of the valve.

The collar 116 is secured by means of the screw 122 and spline assembly 123 to a temperature adjusting knob 120 for rotation therewith. The collar 116 is threadably received within an aperture 125 in the volume control 124. By rotating the collar 116 relative to the volume control knob, the former is longitudinally moved with respect to the latter in a direction depending upon the direction of rotation. When the temperature control knob 120 is rotated so that the collar 116 is moved upwardly the thermal motor assembly 97 is likewise moved upwardly as long as there is an abutting relationship between the bolt 112 and the collar 118. This in turn causes the poppet when in an open position to be moved toward the cold water seat and away from the hot water seat so as to result in an increase in temperature. Conversely, when the temperature adjusting knob 120 is rotated so that the collar 116 is moved downwardly, the bolt 112 and in turn the motor assembly 97 is likewise forced downwardly by the coil spring 119, unless the poppet is already seated on the hot water seat assembly 34. Thus the poppet, if in an open position, is moved toward the hot water seat and away from the cold water seat so as to cause a decrease in temperature. In this manner, it is possible to preselect the temperature of the mixed water that will be discharged by the valve.

As shown in FIGURE 2, the volume control knob is provided with temperature scale 125 for facilitating the selection of a desired mixed water temperature. Thus, the temperature control knob need merely to be brought into coincidence with the desired temperature on the scale 125.

The volume control knob 124 is secured to the upper end of the sleeve 84 by means of the bolts 130. The sleeve 84 is in turn secured to the casing 16 by means of the threads 132. Thus when the volume control knot is rotated the sleeve 84 is likewise rotated and longitudinally moved as a result of the threads 132. When the sleeve 84 is moved, it normally causes the poppet 62 and the motor assembly 97 to move in a like direction.

For example, when the valve is in the open position as shown in FIGURE 1 and the control knob is rotated toward the off direction, both the sleeve 84 and the poppet disk 62 are moved downwardly toward the hot water seat. As the valve seats approach each other so as to reduce the total gap the volume of flow will be diminished. Initially the hot water flow will be reduced. This will cause a reduction in the temperature of the mixed water which will be sensed by the thermal motor assembly 97. Should the volume control knob remain at that position for a period of time, the thermal motor assembly 97 will normally reposition the poppet so as to increase the temperature of the mixed water to the pre-selected level. Assuming that the rotation of the volume control knob is continued toward the off position before the thermal motor assembly 97 senses a change in the temperature of the mixed water or has a chance to compensate for the same, the poppet disk 62 will be brought into engagement with the hot water seat so as to shut it off. At this point, the poppet disk 62 can move no further downwardly. Still further rotation of the volume control knob will cause the sleeve 84 to move downwardly relative to the thermal motor assembly and poppet disk 62 as well as the hot water seat assembly 34. When this happens, the thermal motor assembly 97 will cause compression of the coil spring 119 and the bolt 112 will be lifted from the shoulder 118 as shown in FIGURE 6.

Still further downward movement of the sleeve as a result of rotation of the volume control knob 124 will cause the sleeve 84 to seat on the poppet disk 62 as shown in FIGURE 7. At this point, both the hot water and cold water seat assemblies will be shut off by the poppet disk 62. It will be noted that should a leak occur at either of the seats that the water will flow out through the sleeve and the outlet port 28 as if the valve were in the open condition. There will be no tendency for the leakage to flow into the line connected to the other seat assemlby regardless of their relative pressures.

When the volume control knob is rotated from the off position to an open position the sleeve 84 is moved upwardly relative to the hot water seat assembly 34. The sleeve 84 will also move relative to the poppet disk 62 until the head 114 of the bolt 112 is in its seated position on the shoulder 118. At that point further rotation toward the open position will lift both the sleeve 84 and the poppet disk 62 away from the hot water seat assembly 34. Should the control knob remain in any intermediate open position for a period of time, the thermal motor assembly will drive the poppet until it provides mixed water at the pre-selected temperature. Still further rotation of the volume control knob toward the on position will lift the poppet 62 from the hot water seat assembly 34 until it has assumed a position somewhat similar to that shown in FIGURE 1.

When the temperature control knob 120 is rotated so that the motor assembly and the poppet are moved in a downward direction toward the hot water seat there will be a decerase in the set point temperature. It is apparent that as the set point of the valve is varied so that the poppet position approaches the hot water seat, the preselected temperature of the mixed water will be decreased. Conversely as the poppet position approaches the cold water seat, the temperature of the mixed water will be increased.

It can now be seen that the bolt 112 cooperates with the collar 116 to provide a lost motion connection which permits relative movement between the thermal motor assembly 97 and the sleeve 84. In this manner the poppet assembly 62 and the sleeve 84 may also be moved relative to each other. For example, when the poppet is seated against both seats as shown in FIGURE 6 the temperature control knob 120 may be rotated to provide a preselected temperature when the valve is open. Should the temperature control knob 120 be rotated to a lower preselected temperature, the collar 116 will be moved downwardly so as to increase the distance between the head 112 and the shoulder 118. When the valve is opened the sleeve 84 must be moved a greater distance before the head 112 is seated. In such event the hot water will be shut off initially until the thermal sensing motor has had an opportunity to move the poppet upward so that some hot water flows from the hot water seat assembly 34.

Conversely, should the temperature control knob be rotated toward an increase in temperature when the valve is in an off position the collar 116 and thermal motor assembly 97 will be moved upwardly relative to the valve stem 70. The valve stem 70 will be biased upwardly by the coil spring 107 but is prevented from moving in that direction because of seating engagement with the cold water seat assembly. If the temperature setting is sufficiently high when the valve is opened the poppet will move upwardly along with the sleeve 84 and remain in engagement with the same at least momentarily. In such event hot water flows through the valve and is sensed by the thermal motor assembly which then makes an appropriate correction to unseat the poppet from the cold water seat assembly.

Referring now to FIGURE 9 there is shown a graphical illustration of the valve and the manner in which it operates. The vertical axis of the graph represents the mixed water temperature and the horizontal axis represents the distance of the poppet from the cold water seat. With respect to the vertical axis, obviously the minimum temperature is that of the cold water and the maximum temperature is that of the hot water. Therefore, the mixed water temperature must be within the range intermediate and including the hot and cold water temperatures. Immediately below the graph is a schematic illustration of the valve assembly comprising the cold water seat 150, a hot water seat 152, a poppet 154 which is connected by the stem 156 to a thermal motor 158. For purposes of convenience, it will be assumed that the hot water seat is movable with respect to the cold water seat just the reverse to the preferred embodiment previously described but which would provide the same results.

Referring now to the graph there is a first line BC which represents the mixed water temperature versus poppet position for a given total gap (hereafter referred to as the mixed water temperature curve). When the poppet is in engagement with the cold water seat the temperature of the mixed water will be at a maximum as indicated by the point C and, conversely, when the poppet is in engagement with the seat 152 the temperature will be at a minimum as indicated by the point B. It has been found that when the pressures of the hot and cold water are substantially equal that the line intermediate points B and C is substantially linear. When the pressures are unequal then the lines are curvi-linear as indicated by the dotted lines which have been appropriately marked by the pressure relationship between the hot and cold water.

The line OA represents the characteristic of the thermal motor assembly and specifically the position of the poppet versus motor temperature. It can be seen from the graph that the slope of the line OA is quite low so that it is not possible to show the full length of the line throughout the entire range of temperatures and it has been broken into two segments, the second segment being designated by the letters FE. In fact the slope has been somewhat exaggerated for purposes of illustration, since it may be somewhat lower in actual practice.

The point of intersection A between the motor characteristic curve and the mixed water temperature curve represents a state of equilibrium. It is at this point that the thermal motor is satisfied as to the mixed water temperature and attempts to make no further correction as to the position of the poppet relative to the valve seats. The point A represents a mixed water temperature of $T_1$.

If the pressure of one of the sources should suddenly diminish, the flow from that seat would be changed a proportionate amount so as to cause a commensurate variation in the temperature of the water. This would be sensed by the thermal motor assembly which would then reposition the poppet. Assuming for purposes of illustration, that the hot water pressure dimishes then the temperature curve would be that indicated by $P_c > P_h$. The thermal motor assembly would then move the poppet to the left whereby the space between it and the hot water seat 152 would be increased so that the hot water flow would be increased and the cold water flow decreased. Since the only equilibrium position is the point at which the motor characteristic curve and the mixed water temperature curve intersect then the point of equilibrium is that designated by the letter $A^1$. This would mean that the poppet 154 would be moved to the left an amount corresponding to the distances between A and $A^1$. It is further recognized that due to the slope of the motor characteristic curve that the point $A^1$ represents a slight diminution in the temperature of the mixed water which is designated on the vertical axis as $T_2$. In actual practice it has been found if the pressure of the hot water falls to one-fourth that of the cold water that the reduction in mixed water temperature may be of the magnitude of 1°. Conversely, if the hot water pressure should rise, then the point of equilibrium would be $A^{11}$ which is the intersection of the motor characteristic curve with the line $P_h > P_c$. This would mean that the poppet would have to be moved toward the hot water seat so as to decrease the flow therefrom and to increase the flow from the cold water seat. The point $A^{11}$ represents a slightly higher mixed water temperature $T_3$. In actual practice it has been found that normal encountered deviations in mixed water temperature resulting from normal encountered variations in pressure of one source relative to the other are generally unperceptible to the human body.

If the temperature control knob is rotated so as to increase the temperature the thermo motor assembly 158 will be moved to the left for a pre-determined distance which has been designated in this instance by the letter $a$. The motor characteristic curve then becomes $O^1G$ which is parallel to OA but is spaced therefrom along the horizontal axis an amount equal to the distance $a$. The point of intersection with the mixed water temperature line becomes the point G which is representative of the temperature $T_4$ which according to the graph is obviously higher than $T_1$. This is further manifest by a movement of the poppet to the left away from the hot water seat 152 so as to result in an increase in the flow of hot water and a decrease in the flow of cold water.

If the volume control knob is rotated to diminish the total flow to a position commensurate with $B^1$ then the mixed water temperature line becomes $CB^1$. The temperature for a given setting then becomes $A^{111}$ which represents a temperature $T_5$ which is slightly less than $T_1$ but due to the low slope of the motor characteristic curve the amount in actual practice is found to be within a few degrees. In fact by selecting of a proper motor-seat combination the temperature range may be maintained within a few degrees even when the total volume range extends between a few drops per second to several gallons a minute.

It has also been found that should the temperature of either the hot or cold water vary that the valve within reason will compensate for the same. For example, if the temperature of the cold water should drop, say 5 or 10 degrees, the thermal motor assembly will move the poppet toward the cold water seat so as to diminish the flow therefrom. This, of course, results in an increase in the flow of hot water so that the pre-selected temperature is substantially restored.

From the aforegoing the previously mentioned features and objects of the invention as well as others are apparent. Although a specific embodiment of the invention has been described it is to be understood that this is by way of example and not to be construed as a limitation. It will be apparent to those skilled in the art that the parts and arrangements of the same may be altered where desired. For example, the hot water and cold water seats may be reversed in which event the action of the thermal sensing motor would have to be reversed. In other words instead of a downward movement of the poppet upon sensing an increase in temperature the motor would have to be constructed so as to provide an upward movement. The converse would be true for a decrease in temperature.

The essential relationship between the thermal motor assembly and the hot and cold water seats is that the former provide a negative feed back arrangement. Specifically, the thermal motor must drive the poppet in a direction so as to counteract any undesired variation in temperature of the mixed water.

Other alternations within the scope of the claims will be apparent to those skilled in the art without departing from the spirit of the invention.

I claim:

1. In a mixing valve adapted to be connected to a source of hot liquid and to a source of cold liquid to provide a pre-selected volume of a mixed liquid of a pre-determined temperature, the combination comprising a first valve seat member having port means from which liquid from one of said sources may flow, a second valve seat member having port means from which liquid from the other of said sources may flow, a valve member arranged so that movement thereof to vary the flow from one of said valve seat members will cause an inverse variation in flow from the other of said valve seat member, and means for moving at least one of said valve seat members and said valve member in the same direction relative to the other of said valve seat members to vary the volume of mixed liquid, temperature responsive means mounted in said means for moving, said temperature responsive means positioning said valve member intermediate said first and second valve seat members to maintain the mixed liquid at a predetermined temperature, said first and second valve seat members engaging said valve member in seating relationship when said mixing valve is in an off position.

2. In a mixing valve adapted to be connected to a first source of liquid and to a second source of liquid to provide a pre-selected volume of a mixed liquid, the combination comprising a first valve seat member having port means from which liquid from one of said sources may flow, a second valve seat member having port means from which liquid from the other of said sources may flow, said first and second valve seat members being arranged in confronting substantially co-axial spaced relationship, a valve member positioned intermediate said first and second valve seat members so that movement thereof with respect to one of said valve seat members so as to vary the flow thereof will cause an inverse variation in flow from the other of said valve seat members, and means for moving at least one of said valve seat members and said valve member in the same direction relative to the other of said valve seat members to vary the volume of mixed liquid, temperature responsive means mounted in said means for moving, said temperature responsive means positioning said valve member intermediate said first and second valve seat members to maintain the mixed liquid at a predetermined temperature, said first and second valve seat members engaging said valve member in seating relationship when said mixing valve is in an off position.

3. In a mixing valve adapted to be connected to a first source of liquid an dto a second source of liquid to provide a pre-selected volume of a mixed liquid, the combination comprising a first valve seat member having port means from which liquid from one of said sources may flow, a second valve seat member having port means from which liquid from the other of said sources may flow, said first and second valve seat members arranged in substantially confronting co-axial spaced relationship, a valve member positioned intermediate said first and second valve seat members so that movement thereof with respect to one of said valve seat members to vary the flow therefrom will cause an inverse variation in flow from the other of said valve seat members, means for moving at least one of said valve seat members and said valve member in the same direction relative to the other of said valve seat members to vary the volume of mixed liquid, temperature responsive means mounted in said means for moving, said temperature responsive means positioning said valve member intermediate said first and second valve seat members to maintain the mixed liquid at a predetermined temperature, said first and second valve seat members engaging said valve member in seating relationship when said mixing valve is in an off position, and means for permitting relative movement between said one valve seat member and said valve member.

4. In a mixing valve adapted to be connected to a first source of liquid and to a second source of liquid to provide a pre-selected volume of a mixed liquid, the combination comprising a first valve seat member having port means from which liquid from one of said sources may flow, a second valve seat member having port means from which liquid from the other of said sources may flow, said first and second valve seat members arranged in confronting substantially co-axial spaced relationship, a valve member positioned intermediate said first and second valve seat members so that movement thereof with respect to one of said valve seat members to vary the flow therefrom will cause an inverse variation in flow from the other of said valve seat members, means for moving at least one of said valve seat members and said valve member in the same direction relative to the other of said valve seat members to vary the volume of mixed liquid, temperature responsive means mounted in said means for moving, said temperature responsive means positioning said valve member intermediate said first and second valve seat members to maintain the mixed liquid at a predetermined temperature, said first and second valve seat members engaging said valve member in seating relationship when said mixing valve is in an off position, means for permitting relative movement between said one valve seat member and said valve member, chamber means for receiving flow from said first and second valve seat members for mixing said flow, and an outlet means for exhausting said flow from said chamber means.

5. In a mixing valve adapted to be connected to a source of hot liquid and to a source of cold liquid to provide a mixed liquid at a pre-selected rate of flow and temperature, the combination comprising a first valve seat member having port means from which liquid from one of said sources may flow, a second valve seat member having port means from which liquid from the other of said sources may flow, said first and second valve seat members arranged in confronting substantially co-axial spaced relationship, a valve member positioned intermediate said first and second valve seat members so that movement thereof with respect to one of said valve seat members to vary the flow therefrom will cause an inverse variation in flow from the other of said valve seat members, means for moving at least one of said valve seat members and said valve member in the same direction relative to the other of said valve seat members to vary the volume of mixed liquid, said first and second valve seat members engaging said valve member in seating relationship when said mixing valve is in an off position, means for permitting relative movement between said one valve seat member and said valve member, chamber means for receiving flow from said first and second valve seat members for mixing said flow, an outlet means for exhausting said flow from said chamber means, and temperature responsive means mounted in said means for moving and disposed in said chamber means for sensing the temperature of the mixed liquid therein, said temperature responsive means positioning said valve member intermediate said first and second valve seat members to maintain the mixed liquid at a pre-determined temperature.

6. In a mixing valve adapted to be connected to a source of hot liquid and to a source of cold liquid to provide a pre-selected volume of a mixed liquid of a pre-determined intermediate temperature, the combination comprising a first valve seat member having port means from which liquid from one of said sources may flow, a second valve seat member having port means from which liquid from the other of said sources may flow, said first and second valve seat members being arranged in a confronting substantially co-axial spaced relationship, a valve member positioned intermediate said first and second valve seat member so that movement with respect to one of said valve seat members to vary the flow thereof will cause an inverse variation in the flow from the other of said valve seat members, means for driving said first and second valve seat members and said valve member in and out of seating engagement, and thermal responsive means for sensing the temperature of said mixed liquid, said thermal responsive means being coaxially mounted in said means for driving and selectively positioning said valve member intermediate said first and second valve seat members so as to maintain said mixed liquid at a pre-determined temperature.

7. A mixing valve adapted to be connected to a source of hot liquid and to a source of cold liquid to provide mixed liquid at a pre-selected intermediate temperature and volume, comprising a casing having first port means adapted to be connected to a source of hot liquid, a second port means adapted to be connected to a source of cold liquid and an outlet means through which the mixed water from said first and second port means may flow, said first and second port means being arranged in a substantially co-axial confronting relationship, a valve disk mounted intermediate said first and second port means, stem means for driving said valve disk relative to said first and second port means along the line of co-axiality to cause simultaneous inverse variations in flow therefrom, temperature responsive means mounted coaxial in said stem means for sensing the temperature of the mixed liquid from said first and second port means, said temperature responsive means carried in said stem means and upon sensing a deviation from said pre-selected intermediate temperature means and in turn said valve disk to decrease the flow from one of said port means and to increase the flow from the other of said port means so as to correct said deviations, and means for moving said temperature responsive means relative to at least one of said port means whereby said pre-selected temperature may be varied, and means for moving said first and second port means relative to each other and to said intermediate valve disk along the line of co-axiality to vary the volume of flow, said first and second port means being in sealing engagement with said valve disk when said mixing valve is in an off position.

References Cited by the Examiner

UNITED STATES PATENTS

| | | | |
|---|---|---|---|
| 1,835,330 | 12/1931 | Peters | 236—21 |
| 1,934,499 | 11/1933 | Hall | 236—12 |
| 2,159,819 | 5/1939 | Snediker | 236—12 |
| 2,193,581 | 3/1940 | Clokey | 236—12 |
| 2,801,798 | 8/1957 | Raney | 236—12 |
| 2,910,243 | 10/1959 | Bowman | 236—12 |
| 2,923,478 | 2/1960 | Giulio | 236—12 |
| 2,997,239 | 8/1961 | Priesmeyer | 236—12 |
| 3,044,707 | 7/1962 | Bayer | 236—12 |
| 3,090,559 | 5/1963 | Bayer | 236—12 |

FOREIGN PATENTS 522,577  6/1940  Great Britain.

ALDEN D. STEWART, *Primary Examiner.*

EDWARD J. MICHAEL, *Assistant Examiner.*